United States Patent
Rasmussen

(10) Patent No.: US 9,582,236 B2
(45) Date of Patent: Feb. 28, 2017

(54) USER INTERFACE

(75) Inventor: Lene Leth Rasmussen, Copenhagen V. (DK)

(73) Assignee: Nokia Technologies Oy, Espoo (FI)

( * ) Notice: Subject to any disclaimer, the term of this patent is extended or adjusted under 35 U.S.C. 154(b) by 1436 days.

(21) Appl. No.: 13/250,493

(22) Filed: Sep. 30, 2011

(65) Prior Publication Data

US 2013/0086512 A1   Apr. 4, 2013

(51) Int. Cl.
| | |
|---|---|
| *G06F 3/048* | (2013.01) |
| *G06F 3/14* | (2006.01) |
| *G06F 3/0487* | (2013.01) |
| *G06F 1/16* | (2006.01) |

(52) U.S. Cl.
CPC .......... *G06F 3/1431* (2013.01); *G06F 1/1647* (2013.01); *G06F 3/0487* (2013.01); *G09G 2356/00* (2013.01)

(58) Field of Classification Search
CPC ........ G06F 3/011; G06F 3/017; G06F 3/0354; G06F 3/041; G06F 3/0488; G06F 2203/04808
See application file for complete search history.

(56) References Cited

U.S. PATENT DOCUMENTS

| | | | |
|---|---|---|---|
| 5,748,189 A | 5/1998 | Trueblood | |
| 5,874,958 A | 2/1999 | Ludolph | |
| 6,545,669 B1 * | 4/2003 | Kinawi | G06F 3/0486 345/1.1 |
| 7,752,566 B1 | 7/2010 | Nelson | |
| 8,194,043 B2 | 6/2012 | Cheon et al. | |
| 8,473,870 B2 | 6/2013 | Hinckley et al. | |

(Continued)

FOREIGN PATENT DOCUMENTS

| | | |
|---|---|---|
| EP | 2 214 088 A2 | 8/2010 |
| EP | 2 299 352 A1 | 3/2011 |

(Continued)

OTHER PUBLICATIONS

Office Action for U.S. Appl. No. 13/250,633; dated Mar. 1, 2013.

(Continued)

*Primary Examiner* — Jeffrey A Gaffin
*Assistant Examiner* — Ayesha Huertas Torres
(74) *Attorney, Agent, or Firm* — Alston & Bird LLP

(57) ABSTRACT

An apparatus comprising:
a first display area;
a second display area; and
an interface separating the first display area from the second display area; and
a display controller configured to control display of a user interface element in a first configuration when the user interface element is movable across the interface from the first display area to the second display area and a first criteria dependent upon a distance of the user interface element from the interface is satisfied and is configured to control display of the user interface element in a second configuration, different to the first configuration, when the user interface element is movable across the interface from the first display area to the second display area and the first criteria concerning a distance of the user interface element from the interface is not satisfied.

20 Claims, 3 Drawing Sheets

(56) References Cited

U.S. PATENT DOCUMENTS

| | | | |
|---|---|---|---|
| 2005/0270278 A1* | 12/2005 | Ouchi | G06F 3/038 345/173 |
| 2008/0100531 A1 | 5/2008 | Yoshinaga et al. | |
| 2008/0256484 A1 | 10/2008 | Kraft et al. | |
| 2009/0201270 A1 | 8/2009 | Pikkujamsa et al. | |
| 2009/0322689 A1 | 12/2009 | Kwong et al. | |
| 2010/0146422 A1 | 6/2010 | Seong et al. | |
| 2010/0188352 A1* | 7/2010 | Ikeda | G06F 3/0486 345/173 |
| 2010/0241979 A1 | 9/2010 | Apted | |
| 2010/0245275 A1 | 9/2010 | Tanaka | |
| 2011/0109526 A1 | 5/2011 | Bauza et al. | |
| 2011/0175920 A1 | 7/2011 | Ieperen | |
| 2011/0209057 A1 | 8/2011 | Hinckley et al. | |
| 2011/0209103 A1 | 8/2011 | Hinckley et al. | |
| 2011/0291964 A1 | 12/2011 | Chambers et al. | |
| 2012/0162091 A1 | 6/2012 | Lyons et al. | |
| 2012/0304111 A1 | 11/2012 | Queru | |

FOREIGN PATENT DOCUMENTS

| | | |
|---|---|---|
| EP | 2 309 369 A1 | 4/2011 |
| WO | WO-02/093543 A1 | 11/2002 |
| WO | WO 2011/057271 A1 | 5/2011 |
| WO | WO-2011/076977 A1 | 6/2011 |
| WO | WO 2011/099720 A2 | 8/2011 |

OTHER PUBLICATIONS

Office Action for U.S. Appl. No. 13/250,538 dated Apr. 25, 2014.
International Search Report and Written Opinion for Application No. PCT/IB2012/055212, dated May 14, 2013.
Office Action for U.S. Appl. No. 13/250,633 dated Aug. 29, 2013.
Office Action for U.S. Appl. No. 13/250,538 dated Nov. 3, 2014.
Kennemer, Q.; "Sprint's Kyocera Echo to be a Dual-Screen Android [Ultimate Multi-Tasking]"; [Online] Published: Feb. 7, 2011 @ 11:18 a.m.; Retrieved from the Internet <URL: http://phandroid.com/2011/02/07/sprints-kyocera-echo-to-be-a-dual-screen-android-ultimate-multi-tasking/.
Office Action for U.S. Appl. No. 13/250,538 dated Aug. 15, 2014.
Office Action for U.S. Appl. No. 13/250,538 dated Feb. 14, 2013.
Office Action for U.S. Appl. No. 13/250,567; dated Jun. 18, 2013.
Office Action for U.S. Appl. No. 13/250,538 dated Jun. 19, 2015.
Extended European Search Report from European Patent Application No. 12837203.4 dated Aug. 17, 2015.
Notice of Allowance for U.S. Appl. No. 13/250,538 dated Aug. 31, 2016.
Office Action from Chinese Patent Application No. 201280047867.1 dated Mar. 24, 2016.
Notice of Allowance for U.S. Appl. No. 13/250,538 dated Oct. 8, 2015.

* cited by examiner

USER INTERFACE

TECHNOLOGICAL FIELD

Embodiments of the present invention relate to a user interface comprising a first display area and a second display area.

BACKGROUND

A user interface is a man-machine interface by which an apparatus communicates to a user and/or by which a user communicates to the apparatus.

A user interface may comprise one or more displays with distinct display areas.

BRIEF SUMMARY

It would be desirable to use two distinct display areas separated by an interface, such as for example a gap, as a single display area. However, the presence of the gap can make this problematic as it creates an interrupt in the single display area.

According to various, but not necessarily all, embodiments of the invention there is provided an apparatus comprising: a first display area; a second display area; and an interface separating the first display area from the second display area; and a display controller configured to control display of a user interface element in a first configuration when the user interface element is movable across the interface from the first display area to the second display area and a first criteria dependent upon a distance of the user interface element from the interface is satisfied and is configured to control display of the user interface element in a second configuration, different to the first configuration, when the user interface element is movable across the interface from the first display area to the second display area and the first criteria concerning a distance of the user interface element from the interface is not satisfied.

According to various, but not necessarily all, embodiments of the invention there is provided a method comprising: when a displayed user interface element is movable across an interface separating a first display area from a second display area and a first criteria concerning a distance of the user interface element from the interface is satisfied, displaying the user interface element in a first configuration; and when a displayed user interface element is movable across an interface separating a first display area from a second display area and the first criteria concerning a distance of the user interface element from the interface is not satisfied, displaying the user interface element in a second configuration different to the first configuration.

According to various, but not necessarily all, embodiments of the invention there is provided an apparatus comprising: at least one processor; and at least one memory including computer program code the at least one memory and the computer program code configured to, with the at least one processor, cause the apparatus at least to perform when a displayed user interface element is movable across a interface separating a first display area from a second display area and a first criteria concerning a distance of the user interface element from the interface is satisfied, displaying the user interface element in a first configuration; and when a displayed user interface element is movable across the interface separating the first display area from a second display area and the first criteria concerning the distance of the user interface element from the interface is not satisfied, displaying the user interface element in a second configuration different to the first configuration.

According to various, but not necessarily all, embodiments of the invention there is provided an apparatus comprising: means for displaying a user interface element movable across an interface from one display area to another display area in a first configuration when a first criteria concerning a distance of the user interface element from the interface is satisfied and in a second configuration, different to the first configuration, when the first criteria concerning the distance of the user interface element from the interface is not satisfied.

According to various, but not necessarily all, embodiments of the invention there is provided an apparatus comprising: a first display area; a second display area; and an interface separating the first display area from the second display area; and a display controller configured to control display in the first display area of a user interface element that is movable across the interface from the first display area to the second display area and to control display, in the second display area, of an aura in association with the user interface element indicative to a user that the user interface element is movable across the interface from the first display area to the second display area.

According to various, but not necessarily all, embodiments of the invention there is provided a method comprising: displaying in a first display area a user interface element that is movable from the first display area to a second display area and displaying in the second display area an aura in association with the user interface element indicating to a user that the user interface element is movable across from the first display area to the second display area.

According to various, but not necessarily all, embodiments of the invention there is provided an apparatus comprising: at least one processor; and at least one memory including computer program code the at least one memory and the computer program code configured to, with the at least one processor, cause the apparatus at least to perform: displaying in a first display area a user interface element that is movable from the first display area to a second display area and displaying in the second display area an aura in association with the user interface element indicating to a user that the user interface element is movable across from the first display area to the second display area.

According to various, but not necessarily all, embodiments of the invention there is provided an apparatus comprising: means for displaying in a first display area a user interface element that is movable from the first display area to a second display area and means for displaying in the second display area an aura in association with the user interface element indicating to a user that the user interface element is movable across from the first display area to the second display area.

BRIEF DESCRIPTION

For a better understanding of various examples of embodiments of the present invention reference will now be made by way of example only to the accompanying drawings in which.

Figure 4:
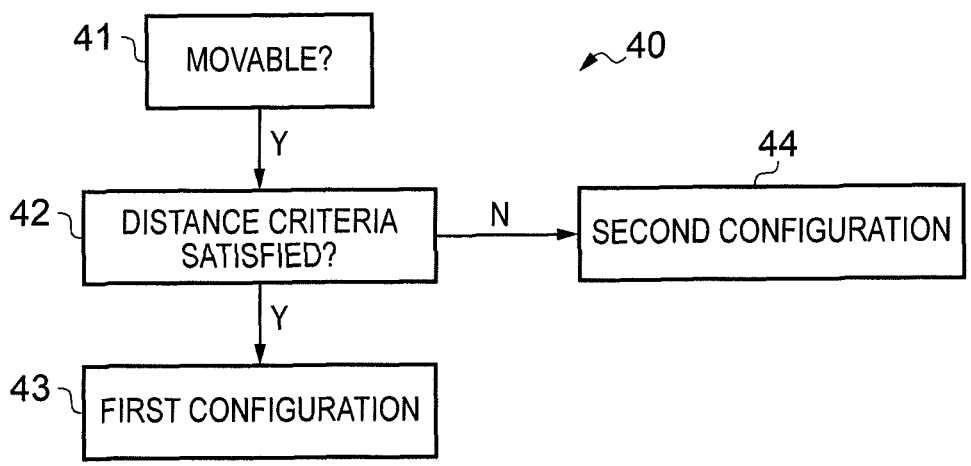
Figure 5:
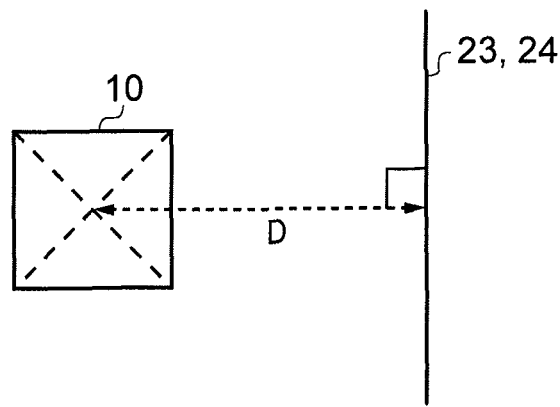
Figure 6:
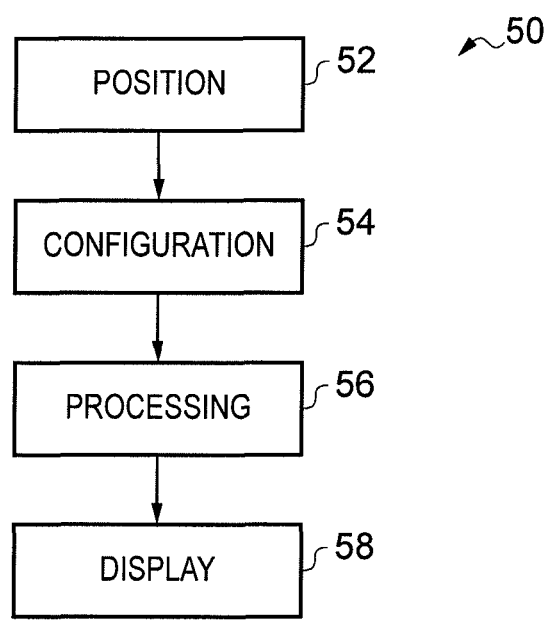

FIG. 4 schematically illustrates a method for controlling a configuration of a user interface element;

FIG. 5 schematically illustrates examples of a first criteria concerning a distance of the user interface element from the interface; and FIG. 6 illustrates a method for controlling the display of a user interface element.

DETAILED DESCRIPTION

The Figures illustrate an apparatus 2 comprising: a first display area 21; a second display area 22; and an interface 16 separating the first display area 21 from the second display area 22; and a display controller 6 configured to control display of a user interface element 10 in a first configuration when the user interface element 10 is movable across the interface from the first display area 21 to the second display area 22 and a first criteria dependent upon a distance of the user interface element 10 from the interface 16 is satisfied and is configured to control display of the user interface element 10 in a second configuration, different to the first configuration, when the user interface element 10 is movable across the interface 16 from the first display area 21 to the second display area 22 and the first criteria concerning a distance of the user interface element 10 from the interface 16 is not satisfied.

Figure 1:
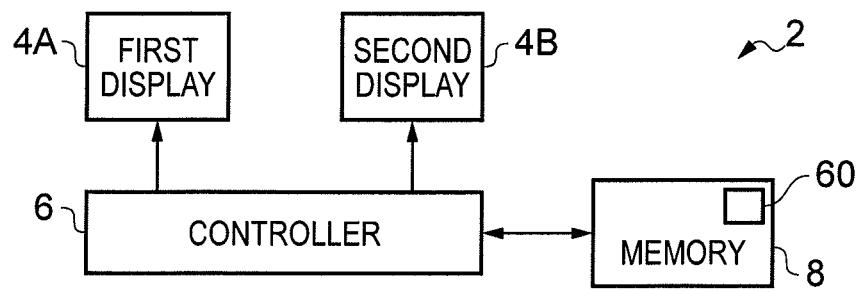
FIG. 1 illustrates an example of an apparatus.

FIG. 1 illustrates an example of an apparatus 2 comprising: a first display 4A defining a first display area 21; a second display 4B defining a second display area 22; and a display controller 6 configured to control display of a movable user interface element 10 in either a first configuration or a different second configuration.

The user interface element 10 may change from the second configuration to the first configuration as the user interface element 10 approaches an interface 16 between the first display area 21 and the second display area 22. This change in configuration indicates, for example visually, to a user that the user interface element 10 is capable of movement across the interface 16 from one of the display areas to the other display area.

Displaying the user interface element 10 in a first configuration may comprise displaying the user interface element differently than in the second configuration.

The apparatus 2 may, for example, be an electronic apparatus such as a personal digital assistant, personal media player, mobile cellular telephone, personal computer, a point of sale terminal etc. In some embodiments the apparatus 2 may be a hand-portable apparatus, that is, an apparatus that is sized to be carried in the palm of a hand or in a jacket pocket.

The display controller 6 is configured, to control display of the user interface element 10 in a first configuration when the user interface element 10 is movable across the interface from the first display area 21 to the second display area 22 and a first criteria dependent upon a distance of the user interface element 10 from the interface 16 is satisfied.

The display controller 6 may also be configured, to control display of the user interface element 10 in a first configuration when the user interface element 10 is movable across the interface from the second display area 22 to the first display area 21 and a first criteria dependent upon a distance of the user interface element 10 from the interface 16 is satisfied.

The display controller 6 is configured to control display of the user interface element 10 in a second configuration, different to the first configuration, when the user interface element 10 is movable across the interface 16 from the first display area 21 to the second display area 22 and the first criteria concerning a distance of the user interface element 10 from the interface 16 is not satisfied.

The display controller 6 may also be configured to control display of the user interface element 10 in a second configuration, different to the first configuration, when the user interface element 10 is movable across the interface 16 from the second display area 22 to the first display area 21 and the first criteria concerning a distance of the user interface element 10 from the interface 16 is not satisfied.

Although the term criteria is normally used to indicate more than one criterion, in this document the term 'criteria' should be understood to indicate one or more criterion.

Figure 2A:
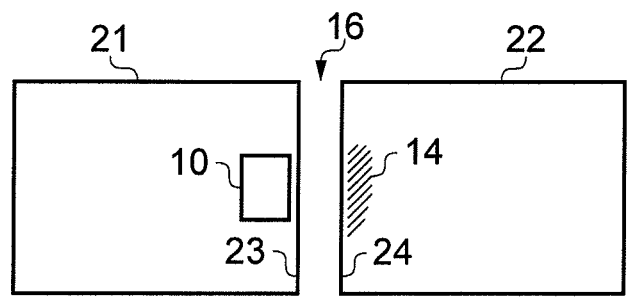
FIG. 2A illustrates an example of a user interface element in a first configuration.
Figure 2B:
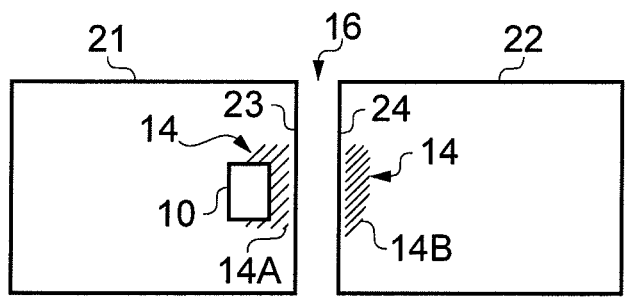
FIG. 2B illustrates another example of a user interface element in a first configuration.
Figure 2C:
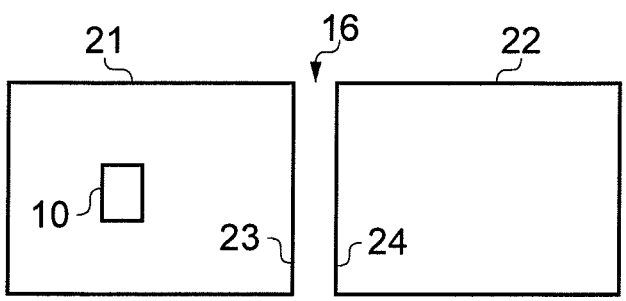
FIG. 2C illustrates an example of a user interface element in a second configuration.

FIGS. 2A, 2B and 2C schematically illustrate a first display area 21; an adjacent second display area 22; and an interface 16 separating the first display area 21 from the second display area 22. A user interface element 10 is movable across the interface 16 from the first display area 21 to the second display area 22 and is movable across the interface from the second display area 22 to the first display area 21. The user interface element 10 is movable in the first display area 21, the second display area 22 and across the interface 16 in response to input from a user.

In this example, the first display area 21 and the second display area 22 are 'landscape' with a width dimension exceeding a height dimension. In other embodiments the first display area 21 and the second display area 22 may be portrait with a width dimension less than a height dimension.

In this example, the first display area 21 and the second display area 22 are the same size. In other embodiments they may be of different size.

The first display area 21 has an edge 23 nearest the second display area 22. The second display area 22 has an edge 24 nearest the first display area 21. The edges 23 and 24 are in this example, but not necessarily all examples, rectilinear and parallel. The distance separating the edges 23, 24 may in some embodiments be less than 5 mm.

In this example, the edges 23, 24 are height-wise edges with the first display area 21 and the second display area side-by-side. However in other embodiments, the edges 23, 24 may be width-wise edges with the first display area 21 and the second display area 22 above-below each other.

There is an interface 16 between the edge 23 of the first display area 21 and the edge 24 of the second display area 22. The interface 16 separates the first display area 21 from the second display area 22 and does not operate as a display. The interface 16 in the illustrated example forms a gap where a user interface element 10 cannot be displayed.

FIGS. 2A and 2B illustrates examples when the user interface element 10 is in a first configuration.

FIG. 3A illustrates an example when the user interface element 10 is in a second configuration.

The configuration of the user interface element 10 is determined by whether a first criteria dependent upon a distance of the user interface element 10 from the interface 16 is satisfied.

In FIGS. 2A and 2B the user interface element 10 is proximal to the interface 16 and the user interface is in a first configuration.

In FIG. 2C the user interface element 10 is distal from the interface 16 and the user interface is in a second configuration.

In these examples, if the user interface element 10 is distal from the interface the user interface element 10 is in a second configuration. Then as the user interface element 10 is moved by a user to be proximal to the interface 16 the configuration of the user interface element 10 changes from the second configuration to the first configuration.

In these examples, if the user interface element 10 is proximal to the interface the user interface element 10 is in a first configuration. Then as the user interface element 10 is moved by a user to be distal from the interface 16 the configuration of the user interface element 10 changes from the first configuration to the second configuration.

The first configuration of the interface element 10 and the second configuration of the user interface element 10 are in these examples visually different so that the user is alerted to the fact that the user interface element 10 may be moved over the interface 16 when it is moved towards the interface 16.

It should be appreciated that different configurations are possible.

In FIGS. 2A and 2B, the user interface element 10 is displayed in a first configuration with an aura 14. An aura may be considered to be a localized background that is distinct from the more general background. The aura may in some examples be monochrome. The term aura is intended to also encompass 'shadow' and 'halo'.

In FIG. 2A, the user interface element 10 is displayed in the first display area 21 and the whole of the aura 14 is displayed in the second display area at the portion of the edge 24 nearest the user interface element 10.

In FIG. 2B, the user interface element 10 is displayed in the first display area 21, a first portion 14A of the aura 14 is displayed in the first display area 21 at the user interface element 10 and a second portion 14B of the aura 14 is displayed in the second display area 22 at the portion of the edge 24 nearest the user interface element 10. As the user interface element 10 is moved towards the interface 16 into the second display area 22, the first portion 14A of the aura 14 becomes smaller and the second portion 14B of the aura 14 becomes larger.

In FIGS. 2A and 2B, the aura leads the user interface element 10. That is, if the user interface element 10 were being moved towards the interface 16 the aura is predominantly positioned in front of the user interface element 10. The brightness or intensity of the aura may increase as the user interface element 10 moves towards the interface 16 and/or the color of the aura may change as the user interface element 10 moves towards the interface 16. At some point during the movement of the user interface element 10 across the interface 16 the aura will be switched to trail the user interface element 10. That is if the user interface element were being moved away from the interface 16 towards the center of the second display area 22, the aura would be predominantly positioned behind the user interface element 10.

It will be appreciated that this creates a symmetry such that the user interface element 10 has a first configuration when it approaches the interface whether that approach is from the first display area 21 or from the second display area 22. The aura 14 will also be symmetrical. It is positioned in the second display area 22 when the user interface element is adjacent the interface 16 in the first display area 21. It is positioned in the first display area 21 when the user interface element 10 is adjacent the interface 16 in the second display area 22.

In FIG. 2C the user interface element is displayed in a second configuration without an aura 14.

Figure 3:
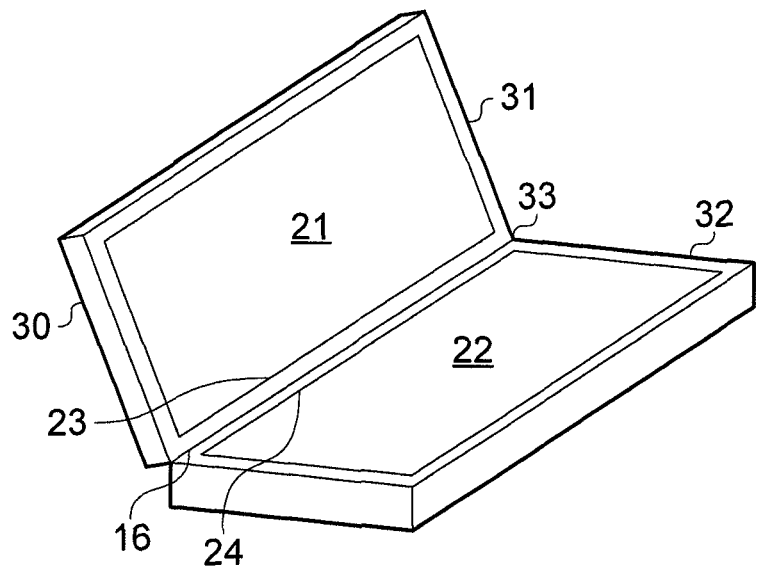
FIG. 3 illustrates in perspective view an example of a dual display apparatus.

FIG. 3 illustrates in perspective view an example of a dual display apparatus 2. In this example the first display area 21 is rotatable relative to the second display area 22 about an axis in the gap 16.

The apparatus 2 comprises a housing 30 that has a first housing part 31 connected to a second housing part 32 via a hinge 33. The first housing part 31 supports the first display 4A defining the first display area 21. The second housing part 32 supports the second display 4B defining the second display area 22.

The straight edge 23 of the first display area 21 nearest the gap 16 is parallel to the straight edge 24 of the second display area 22 nearest the gap 16. Separation between the edges 23, 24 is constant and may be less than 5 mm.

The gap 16 is occupied in this example by a portion of the first housing part 31, the hinge 33 and a portion of the second housing part 32.

The first display 4A and/or the second display 4B may be a touch sensitive display. A touch sensitive display is capable of providing output to a user and also capable of simultaneously receiving touch or proximity input from a user while it is displaying.

A user interface element 10 may be any item that is displayable on a display used as a user interface. It may, for example, be an icon, widget or similar. It may, for example, be an output from an application such as an application window.

The user interface element 10 may be static or dynamic. Static means that it does not change appearance over time. Dynamic means that it changes appearance (shape or color etc) over time.

A user interface element 10 may be fixed or moveable. Fixed means that it does not change position over time. Moveable means that it changes position over time. If may, for example, be movable under the control of a user.

FIG. 4 schematically illustrates a method 40 for controlling a configuration of a user interface element 10.

At block 41 it is determined whether or not a user interface element 10 is movable across an interface 16 separating a first display area 21 from a second display area 22. If the user interface element 10 is moveable from the display area in which it is positioned to the other display area, the method moves to block 42. If the user interface element 10 is not moveable in this way, the method ends.

At block 42 it is determined whether or not a first criteria concerning a distance of the user interface element 10 from the interface 16 is satisfied. If the first criteria is satisfied, the method moves to block 43. If the first criteria is not satisfied, the method moves to block 44.

At block 43 the user interface element 10 is displayed in the first configuration.

At block 44 the user interface element 10 is displayed in the second configuration.

At block 41, if the user interface element 10 is not moveable from the display area in which it is positioned to the other display area, instead of ending, the method may alternatively move to block 44.

FIG. 5 schematically illustrates examples of a first criteria concerning a distance of the user interface element 10 from the interface 16.

The Figure illustrates a user interface 10 at a distance D from the edge 23/24 of the display area 21/22 in which the user interface element 10 is displayed. The distance D is the shortest distance between the user interface element 10 and the interface 16.

The first criteria concerning a distance of the user interface element from the interface may, for example, be satisfied when the shortest distance D between the user interface element and the interface 16 is less than a distance threshold value $T_D$. That is the first criteria may be $D<T_d$.

The first criteria concerning a distance of the user interface from the interface is satisfied when a change in the shortest distance D between the user interface element 10 and the interface 16 over time exceeds a speed threshold value $T_D'$. That is the first criteria may be $dD/dt>T_d'$.

The first criteria concerning a distance of the user interface element from the interface may, for example, be satisfied when:

a) the shortest distance D between the user interface element and the interface is less than a distance threshold value $T_D$; and/or b) the change in the shortest distance D between the user interface element 10 and the interface 16 over time exceeds a speed threshold value $T_D'$ That is the first criteria may be $D<T_d$ AND $dD/dt>T_d'$ or $D<T_d$ OR $dD/dt>T_d'$.

FIG. 6 illustrates a method 50 for controlling display of a user interface element 10.

At block 52, a position of the user interface element 10 is determined.

At block 54, the method 40 determines a configuration for the user interface element 10. It determines whether or not a first criteria concerning a distance of the user interface from the interface is satisfied. This block has been described in detail with reference to the method 40 of FIG. 4.

Next at block 56, the controller 6 processes data representing the user interface element 10 to generate data representing the user interface 10 according to either the first configuration or the second configuration.

Next at block 58 the controller 6 controls the first display 4A and the second display 4B to display the user interface element 10 either in the first configuration e.g. with aura or in the second configuration e.g. without aura.

Referring back to FIG. 1, the controller 6 may be implemented using instructions that enable hardware functionality, for example, by using executable computer program instructions in a general-purpose or special-purpose processor that may be stored on a computer readable storage medium (disk, memory etc) to be executed by such a processor.

In an embodiment where the controller 6 is provided using a processor, the processor 6 is configured to read from and write to the memory 8. The processor 6 may also comprise an output interface via which data and/or commands are output by the processor 6 and an input interface via which data and/or commands are input to the processor 6.

The memory 8 stores a computer program 60 comprising computer program instructions that control the operation of the apparatus 2 when loaded into the processor 6. The computer program instructions 60 provide the logic and routines that enables the apparatus to perform the methods illustrated in FIGS. 2A, 2B, 2C, 4, 5 and 6. The processor 6 by reading the memory 8 is able to load and execute the computer program 60.

The apparatus therefore comprises: at least one processor 6; and at least one memory 8 including computer program code 60 the at least one memory 8 and the computer program code 60 configured to, with the at least one processor, cause the apparatus at least to perform when a displayed user interface element is movable across a interface separating a first display area from a second display area and a first criteria concerning a distance of the user interface element from the interface is satisfied, displaying the user interface element in a first configuration; and when a displayed user interface element is movable across the interface separating the first display area from a second display area and the first criteria concerning the distance of the user interface element from the interface is not satisfied, displaying the user interface element in a second configuration different to the first configuration.

The computer program may arrive at the apparatus 2 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 60. The delivery mechanism may be a signal configured to reliably transfer the computer program 60. The apparatus 2 may propagate or transmit the computer program 60 as a computer data signal.

Although the memory 8 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device."

As used here 'module' refers to a unit or apparatus that excludes certain parts/components that would be added by an end manufacturer or a user. The controller may be a module.

The blocks illustrated in the FIGS. 4 and 6 may represent steps in a method and/or sections of code in the computer program 60. The illustration of a particular order to the blocks does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed.

For example, although the above described examples have used only two distinct display areas, the pair of display areas may be considered as any permutation or combination of two adjacent display areas in a multi-display area system.

Although the interface 16 is illustrated as a narrow gap in some embodiments it may be large, for example larger than a dimension or maximum dimension of a display area. The display areas do not need to be attached to each other. If the pair of display areas are not attached to each other, a mechanism may be provided for measuring the distance between display areas. For example, transmitters and receivers may be used to measure the distance using time of flight estimation.

For example, the apparatus 2 may comprise: means for displaying a user interface element movable across an interface from one display area to another display area in a first configuration when a first criteria concerning a distance of the user interface element from the interface is satisfied and in a second configuration, different to the first configuration, when the first criteria concerning the distance of the user interface element from the interface is not satisfied.

For example, the apparatus 2 may comprise: a first display area; a second display area; and an interface separating the first display area from the second display area; and a display controller configured to control display in the first display area of a user interface element that is movable across the interface from the first display area to the second display area and to control display in the second display area an aura in association with the user interface element indicating to a user that the user interface element is movable across the interface from the first display area to the second display area.

For example there may be provided a method comprising: displaying in a first display area a user interface element that is movable from the first display area to a second display area and displaying in the second display area an aura in association with the user interface element indicating to a user that the user interface element is movable across from the first display area to the second display area.

For example, the apparatus 2 may comprise: at least one processor; and at least one memory including computer program code the at least one memory and the computer program code configured to, with the at least one processor, cause the apparatus at least to perform: displaying in a first display area a user interface element that is movable from the first display area to a second display area and displaying in the second display area an aura in association with the user interface element indicating to a user that the user interface element is movable across from the first display area to the second display area.

For example, the apparatus 2 may comprise: means for displaying in a first display area a user interface element that is movable from the first display area to a second display area and means for displaying in the second display area an aura in association with the user interface element indicating to a user that the user interface element is movable across from the first display area to the second display area.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising:
   a first display area;
   a second display area distinct from the first display area; and
   an interface physically separating the first display area from the second display area; and
   a display controller configured to control display of a user interface element in a first configuration in the first display area, when the user interface element is movable across the interface from the first display area to the second display area and a first criteria dependent upon a distance of the user interface element from the interface is satisfied, indicating the user interface element is within the distance of the interface, and is configured to control display of the user interface element in a second configuration, different to the first configuration, when the user interface element is movable across the interface from the first display area to the second display area and the first criteria concerning a distance of the user interface element from the interface is not satisfied.

2. An apparatus as claimed in claim 1, wherein displaying the user interface element in a first configuration comprises displaying the user interface element differently than in the second configuration.

3. An apparatus as claimed in claim 1, wherein displaying the user interface element in the first configuration comprises displaying the user interface element with an aura and wherein displaying the user interface element in the second configuration comprises displaying the user interface element without an aura.

4. An apparatus as claimed in claim 3, wherein displaying the user interface element in the first configuration comprises displaying the user interface element in the first display area and at least a portion of the aura in the second display area.

5. An apparatus as claimed in claim 3, wherein displaying the user interface element in the first configuration comprises displaying the user interface element in the first display area and a whole of the aura in the second display area.

6. An apparatus as claimed in claim 1, wherein displaying the user interface element in the first configuration comprises displaying the user interface element with a localized background and wherein displaying the user interface element in the second configuration comprises displaying the user interface element without a localized background.

7. An apparatus as claimed in claim 6, wherein displaying the user interface element in the first configuration comprises displaying the user interface element in the first display area and at least a portion of the localized background in the second display area.

8. An apparatus as claimed in claim 7, wherein the localized background has a single color.

9. An apparatus as claimed in claim 1, wherein the first criteria concerning a distance of the user interface element from the interface is satisfied when the shortest distance between the user interface element and the interface is less than a distance threshold value.

10. An apparatus as claimed in claim 1, wherein the first criteria concerning a distance of the user interface from the interface is satisfied when a change in the distance between the user interface element and the interface over time exceeds a speed threshold value.

11. An apparatus as claimed in claim 1, wherein the first criteria concerning a distance of the user interface from a interface is satisfied when the shortest distance between the user interface element and the interface is less than a distance threshold value and a change in the distance between the user interface element and the interface over time exceeds a speed threshold value.

12. An apparatus as claimed in claim 1, wherein the display controller is configured to display the user interface element in a second configuration when the user interface element is not movable across the interface from the first display area to the second display area irrespective of the position of the user interface element.

13. A method comprising:
when a displayed user interface element is movable across an interface physically separating a first display area from a second display area that is distinct from the first display area and a first criteria concerning a distance of the user interface element from the interface is satisfied, indicating the user interface element is within the distance of the interface, displaying the user interface element in a first configuration, in the first display area; and
when a displayed user interface element is movable across the interface separating the first display area from the second display area and the first criteria concerning a distance of the user interface element from the interface is not satisfied, displaying the user interface element in a second configuration different to the first configuration.

14. A method as claimed in claim 13, wherein displaying the user interface element in a first configuration comprises displaying the user interface element differently than in the second configuration.

15. A method as claimed in claim 13, wherein the first criteria concerning a distance of the user interface from a interface is satisfied when the shortest distance between the user interface element and the interface is less than a distance threshold value.

16. A method as claimed in claim 13, wherein the first criteria concerning a distance of the user interface from a interface is satisfied when a change in the distance between the user interface element and the interface over time exceeds a speed threshold value.

17. A method as claimed in claim 13, wherein displaying the user interface element in the first configuration comprises displaying the user interface element with an aura and wherein displaying the user interface element in the second configuration comprises displaying the user interface element without an aura.

18. A method as claimed in claim 17, wherein displaying the user interface element in the first configuration comprises displaying the user interface element in the first display area and at least a portion of the aura in the second display area.

19. A method as claimed in claim 17, wherein displaying the user interface element in the first configuration comprises displaying the user interface element in the first display area and a whole of the aura in the second display area.

20. An apparatus comprising:
at least one processor; and
at least one memory including computer program code the at least one memory and the computer program code configured to, with the at least one processor, cause the apparatus at least to perform:
displaying in a first display area a user interface element that is movable from the first display area to a second display area that is physically separate and distinct from the first display area, wherein the user interface element is configured to indicate the user interface element is within a set distance of the interface; and
displaying in the second display area an aura in association with the user interface element indicating to a user that the user interface element is movable across from the first display area to the second display area, wherein the aura comprises a localized background.

* * * * *